(12) United States Patent
Tsuchida et al.

(10) Patent No.: US 11,870,892 B2
(45) Date of Patent: Jan. 9, 2024

(54) INFORMATION PROCESSING APPARATUS, SECRET CALCULATION METHOD, AND PROGRAM

(71) Applicant: NEC Corporation, Tokyo (JP)

(72) Inventors: Hikaru Tsuchida, Tokyo (JP); Toshinori Araki, Tokyo (JP); Kazuma Ohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 17/283,041

(22) PCT Filed: Oct. 11, 2018

(86) PCT No.: PCT/JP2018/037967
§ 371 (c)(1),
(2) Date: Apr. 6, 2021

(87) PCT Pub. No.: WO2020/075273
PCT Pub. Date: Apr. 16, 2020

(65) Prior Publication Data
US 2021/0351916 A1 Nov. 11, 2021

(51) Int. Cl.
*H04L 29/06* (2006.01)
*H04L 9/08* (2006.01)
*G06F 7/72* (2006.01)

(52) U.S. Cl.
CPC .............. *H04L 9/085* (2013.01); *G06F 7/727* (2013.01)

(58) Field of Classification Search
None
See application file for complete search history.

(56) References Cited

U.S. PATENT DOCUMENTS

| 8,468,244 B2* | 6/2013 | Redlich ................. G06Q 50/18 715/255 |
| 9,954,677 B2* | 4/2018 | Ross ....................... H04L 9/001 |
| 2011/0194691 A1 | 8/2011 | Rane et al. |
| 2013/0325884 A1 | 12/2013 | Soel et al. |
| 2014/0289293 A1* | 9/2014 | Langhammer ........ G06F 7/5324 708/203 |
| 2016/0218862 A1* | 7/2016 | Ikarashi .................. H04L 9/085 |

(Continued)

FOREIGN PATENT DOCUMENTS

| JP | 2008-020871 A | 1/2008 |
| JP | 2009-271584 A | 11/2009 |

(Continued)

OTHER PUBLICATIONS

International Search Report for PCT Application No. PCT/JP2018/037967, dated Dec. 18, 2021.

(Continued)

*Primary Examiner* — Maung T Lwin

(57) ABSTRACT

When an absolute value of a difference value between a first share and a second share which are secret-shared is less than or equal to a natural number t, the information processing apparatus calculates the difference value between the first share and the second share. Furthermore, the information processing apparatus performs a comparison in magnitude of the first share and the second share using bit-decomposition from a least significant bit to an m-th bit (m being a natural number) of the difference value.

18 Claims, 12 Drawing Sheets

(56) References Cited

U.S. PATENT DOCUMENTS

| | | | |
|---|---|---|---|
| 2018/0158377 A1 | 6/2018 | Ikarashi et al. | |
| 2018/0276661 A1* | 9/2018 | van Wingerden | ... G06Q 20/383 |
| 2019/0340215 A1 | 11/2019 | Chida et al. | |

FOREIGN PATENT DOCUMENTS

| | | |
|---|---|---|
| JP | 2011-164607 A | 8/2011 |
| JP | 2011-211593 A | 10/2011 |
| JP | 2017-009840 A | 1/2017 |
| WO | 2016/208437 A | 12/2016 |
| WO | 2018/008541 A | 1/2018 |

OTHER PUBLICATIONS

Andrew C. Yao, "Protocols for secure computations.", in Proceedings of the 23rd Annual Symposium on Foundations of Computer Science(SFCS '82). IEEE Computer Society, Washington, DC, USA, 1982, pp. 160-164.

Somesh Jha et al., "Towards practical privacy for genomic computation", in 2008 IEEE Symposium on Security and Privacy, 2008, pp. 216-230.

Yan Huang et al., "Faster Secure Two-Party Computation Using Garbled Circuits.", in USENIX Security Symposium, 2011, vol. 201, No. 1.

Muhammad Naveed et al., "Controlled functional encryption.", in: ACM CCS, 2014, pp. 1280-1291.

Robert A. Wagner et al., "The string-to-string correction problem", Journal of the Association for Computing Machinery, vol. 21, No. 1, Jan. 1974, pp. 168-173.

Gene Myers, "A fast bit-vector algorithm for approximate string matching based on dynamic programming", Journal of the Association for Computing Machinery, vol. 46, No. 3, May 1999, pp. 395-415.

Craig Gentry et al., "Homomorphic Evaluation of the AES Circuit.", 2012, in: Safavi-Naini R., Canetti R. (eds) Advances in Cryptology—CRYPTO 2012. CRYPTO 2012. Lecture Notes in Computer Science, Springer, Berlin, Heidelberg, vol. 7417, pp. 850-867.

Jung Hee Cheon et al., "Homomorphic computation of edit distance.", in International Conference on Financial Cryptography and Data Security, 2015, pp. 194-212.

Toshinori Araki et al., "High-Throughput Semi-Honest Secure Three-Party Computation with an Honest Majority.", in Proceedings of the 2016 ACM SIGSAC Conference on Computer and Communications Security (CCS '16). ACM, New York, NY, USA, 2016, pp. 805-817.

T. Araki et al., "Optimized Honest-Majority MPC for Malicious Adversaries—Breaking the 1 Billion-Gate Per Second Barrier", IEEE Symposium on Security and Privacy (SP), San Jose, California, USA, 2017, pp. 843-862.

Xiao Shaun Wang et al., "Efficient Genome-Wide, Privacy-Preserving Similar Patient Query based on Private Edit Distance.", in Proceedings of the 22nd ACM SIGSAC Conference on Computer and Communications Security (CCS 15). ACM, New York, NY, USA, 2015, pp. 492-503.

Aziz, Md Momin Al et al., "Secure approximation of edit distance on genomic data.", iDASH Privacy and Security Workshop 2016 Chicago, IL, USA. Nov. 11, 2016, BMC Medical Genomics, 2017, pp. 57-67.

Asharov, Gilad et al., "Privacy-Preserving Search of Similar Patients in Genomic Data.", 2017, IACR Cryptology ePrint Archive 2017 (2017), Jun. 10, 2018, pp. 1-30.

Benny Pinkas et al., "Phasing: private set intersection using permutation-based hashing.", in Proceedings of the 24th USENIX Conference on Security Symposium (SEC'15) Aug. 12-14, 2015 Washington D.C., Jaeyeon Jung (Ed.). USENIX Association, Berkeley, CA, USA, 2015, pp. 515-530.

Fickett JW, "Fast optimal alignment.", Nucleic Acids Research, vol. 12, No. 1, 1984, pp. 175-179.

Japanese Office Action for JP Application No. 2020-549907 dated Jun. 7, 2022 with English Translation.

Ivan Damgard et al., Unconditionally Secure Constant-Rounds Multi-party Computation for Equality, Comparison, Bits and Exponentiation, LNCS, Theory of Cryptography, Springer, 2006, vol. 3876, pp. 285-304.

\* cited by examiner

| SCHEME | COMMUNICATION TRAFFIC WHEN PERFORMED BY SCHEME OF NPLS 10 AND 11 [BIT] | THE NUMBER OF COMMUNICATION ROUNDS WHEN PERFORMED BY SCHEME OF NPLS 10 AND 11 [TIMES] |
|---|---|---|
| WF METHOD | 18,210,000 | 13,532 |
| BIT-PARALLELISM METHOD | 522,900 | 12,100 |
| FIRST EXAMPLE EMBODIMENT | 14,670,000 | 1,791 |
| SECOND EXAMPLE EMBODIMENT | 20,430,000 | 1,592 |

1

INFORMATION PROCESSING APPARATUS, SECRET CALCULATION METHOD, AND PROGRAM

FIELD

This application is a National Stage Entry of PCT/JP2018/037967 filed on Oct. 11, 2018, the contents of all of which are incorporated herein by reference, in their entirety.

BACKGROUND

In recent years, research and development on a secret calculation (multi party calculation; MPC) have been actively carried out. In the secret calculation (secure computation), predetermined processings can be performed while keeping input data secret and a result can be obtained.

Secret calculation protocols are broadly divided into two types. A first scheme is a secret calculation protocol which can only perform a particular calculation. A second scheme is a secret calculation protocol which can perform an arbitrary calculation. Furthermore, there are various schemes in the second scheme, and there is a trade-off in a cost as to communication traffic (data amount) and the number of communication rounds among the schemes. That is, there are a scheme in which the communication traffic is small but the number of communication rounds is large and a scheme in which the communication traffic is large but the number of communication rounds is small.

As described above, because, in a secret calculation, arbitrary processing can be performed while keeping input data secret, it is considered to apply the secret calculation to a field in which it is strongly required to protect private information. For example, a medical field is taken as an application field of a secret calculation. Concretely, it is studied to perform calculations pertaining to genomic medicine while keeping genomic information secret. For example, as the calculations pertaining to the genomic medicine, there is a calculation of an edit distance between two DNAs (Deoxyribo Nucleic Acid).

Non-Patent Literature (NPL) 1 discloses a technology called GC (Garbled Circuit). GC is a representative scheme of a secret calculation between two parties and an arbitrary logic circuit calculation can be realized by generating an encrypted circuit. The scheme of the secret calculation has a property that, at the time of execution, the number of communication rounds is suppressed to a constant number, whereas communication traffic is large.

NPLs 2 to 4 disclose a calculation method of the edit distance using GC (Garbled Circuit) described above. Furthermore, NPL 5 discloses an algorithm for the edit distance using a DP (Dynamic Programming) matrix. Please note that the DP matrix is a matrix (table) used during a calculation process of the edit distance. Furthermore, NPL 6 discloses a difference of scores between adjacent cells is any one of 1, 0 and −1 when a cost of insertion, deletion and replacement is "1" in a calculation of an edit distance.

NPL 2 proposes a scheme for performing all calculations of scores which are necessary when an edit distance is calculated using GC and a scheme for calculating by dividing a DP matrix. In NPL 2, it is described that a distance calculation between 500-character strings can be executed within an hour by the latter DP matrix divisional scheme.

NPL 3 discloses a technology for optimizing an edit distance calculation circuit and improving efficiency of GC. In NPL 3, it is disclosed that, when an edit distance calculation is performed between 100-character strings in which each character is 8 bits, it takes 92.4 seconds when all calculations in NPL 2 are performed by GC but it takes 4.1 seconds to be completed by a scheme proposed by NPL 3.

NPL 4 discloses a technology which can hide a calculating function from a particular party (secret calculation server) while performing GC. That is, by using the technology disclosed in NPL 4, it is possible to hide whether the particular party is calculating an edit distance or performing other calculation. According to the technology by this literature, when an edit distance calculation is performed between 100-character strings in which each character is 2 bits, it takes 6.97 seconds as execution time excluding a pre-calculation, NPL 7 discloses a technology called FHE (Fully Homomorphic Encryption). FHE is an encryption scheme in which, assuming an encrypted text is Enc(m), Enc($m_0$)*Enc($m_1$)=Enc($m_0$*$m_1$), Enc($m_0$)+Enc($m_1$)=Enc($m_0$+$m_1$) hold for any plaintext $m_0$, $m_1$ in a plaintext space. Please note that "*" and "+" respectively indicate a multiplication operator and an addition operator. In FHE, because it is possible to perform operations between encrypted texts as described above on a single server, no communication cost is generated for the calculation. However, the FHE scheme has a characteristic that encrypted text length is very large.

NPL 8 discloses a calculation method of an edit distance using FHE as described above. In NPL 8, one character is regarded as a bit string and an encrypted text is generated for each bit. Please note that because, in NPL 8, DNA sequences are supposed as a target of an edit distance, one character is a 2-bit string. In a technology of NPL 8, 5 hours and 13 minutes are necessary when the edit distance calculation between 8-character strings are performed for 682 sequences.

NPL 9 and NPL 10 disclose a secret sharing based inter-3-party secret calculation. The secret sharing based secret calculation is a scheme for calculating each gate of a circuit in a state where each input is shared among participants (parties: secret calculation servers). Furthermore, according to NPL 11 and NPL 12, both an arithmetic circuit and a logic circuit can calculate as a secret sharing based calculation. A secret sharing based secret calculation has a characteristic that the number of communication rounds increases in proportion to a depth of a circuit passing through multiplication gates and logic gates although communication traffic is small.

In NPL 9, an edit distance is calculated using the technology disclosed in NPL 12. In the calculation of the edit distance in NPL 9, 145 executions per second is realized for an edit distance calculation between 100-character strings in which each character is 2 bits. Please note that a circuit of NPL 12 has a fraud detection function and has higher safety than technologies disclosed in NPL 2 and NPL 3 described above and NPLs 10 to 12 described later.

NPLs 13 to 15 disclose a technology to calculate an approximate value of an edit distance. In NPLs 10 to 13, a calculation in which a precision is reduced (approximate calculation) is realized by limiting to an edit distance calculation pertaining to DNA base sequences. As a result, improvement of performance of a secret calculation is achieved.

NPL 13 proposes an approximate calculation of an edit distance for the human genome. In NPL 13, a known sequence called the reference genome is used by limiting a target of calculation of edit distance to the human genome. Concretely, with respect to the reference genome and two sequences for which the edit distance is to be calculated, sets are respectively generated, each of which has an operation of insertion, deletion or replacement per character as elements. Here, let the reference genome be R and the two sequences for which the edit distance is to be calculated be A and B, a set generated from R and A is represented by A', and a set generated from R and B is represented by B'. In NPL 13, $$|(A'-B')\cup(B'-A')|$$

is calculated as the edit distance. More concretely, in NPL 13, $$|(A'-B')\cup(B'-A')|$$

is calculated by GC.

Please note that, in NPL 13, it takes 196.1 seconds for 10 pairs of sequences when the edit distances are calculated accurately in such manner that relative errors are suppressed up to 1% for an edit distance calculated at 90% in a test case.

NPL 14 proposes a scheme for calculating the edit distance using PSI (Private Set Intersection) disclosed in NPL 16 and calculating the edit distance further using GC to the calculation. Please note that PSI is a protocol, in which two sets are input, for obtaining only information as to common elements while hiding the input.

In the scheme using PSI disclosed in NPL 14, a character string of "shingling" is divided to characters of a fixed-length and a set of the divided characters are generated by query character strings (sequences) and character strings (sequences) of a database side. In NPL 14, common part of respective sets is calculated as approximate values of the edit distances. At this time, PSI is used.

In a scheme using PSI and GC disclosed in NPL 14, a calculation method of the edit distance called Banded Alignment disclosed in NPL 17 is calculated by GC. Banded Alignment is one of approximate value calculations of the edit distance which can be used in case where lengths and character strings between sequences such as DNA sequences can be treated as being very close to each other. In NPL 14, an edit distance is obtained for a sequence in a database by the above scheme (a scheme using PSI) with respect to a sequence queried by a client. Then, top-t (=ck, C≥1) sequences with smaller values are selected. Furthermore, Banded Alignment is performed by GC to select k sequences from t sequences and sent to the client as a response. In this method, when a demonstration experiment is performed in which 50 queries are made to a database having 2000 records whose sequence length is 9000 to 10000 and above 10 sequences are responded, it takes 181 seconds for pre-calculations and 730 seconds as calculation time from issuing the query.

NPL 15 discloses an approximate value calculation of the edit distance based on GC. In NPL 15, a character string is divided and the edit distance is calculated for each block. Furthermore, in NPL 15, by treating a sum of the edit distances above calculated as an edit distance for a whole character string, a cost of the edit distance is reduced. More precisely, the calculation cost of the edit distance is reduced from $O(|x|\cdot|y|)$ to $O(|x|+|y|)$. Please note that $|x|$, $|y|$ represent character string lengths of respective character strings x, y. Furthermore, in NPL 15, by letting the calculation target of the edit distance be the human genome, sequences to be calculated are divided to respective blocks using the reference genome, and calculations of the edit distances for respective blocks are made efficient. Please note that, in NPL 15, an experiment has been repeatedly held 100 times, in each of which, with respect to a dataset called ZNF717 which includes 500 records each length of which is 3470, 5 records closest to a queried sequence on the edit distance are returned as a response. In the experiment, it takes 11.86 seconds for a pre-calculation of a server, 1.22 seconds as execution time of the server side upon the query, and 0.48 seconds as execution time on a client side. Furthermore, let the number of correct outputs be p and the number of wrong outputs be n in the number of sequences returned by an algorithm, p/(p+n) is treated as precision. In this case, it is described in NPL 15 that precision as a result of the experiments is 98.85%.

NPL 1: Andrew C. Yao, "Protocols for secure computations.", 1982, In Proceedings of the 23rd Annual Symposium on Foundations of Computer Science (SFCS '82). IEEE Computer Society, Washington, DC, USA, 160-164.

NPL 2: Jha, S., Kruger, L., & Shmatikov, V, "Towards practical privacy for genomic computation", 2008, In Security and Privacy, 2008. SP 2008. IEEE Symposium on (pp. 216-230). IEEE.

NPL 3: Huang, Y., Evans, D., Katz, J., & Malka, L, "Faster Secure Two-Party Computation Using Garbled Circuits.", 2011, In USENIX Security Symposium (Vol. 201, No. 1).

NPL 4: Naveed, M., Agrawal, S., Prabhakaran, M., Wang, X., Ayday, E., Hubaux, J., Gunter, C. A., "Controlled functional encryption.", 2014, In: ACM CCS, pp. 1280-1291 (2014)

NPL 5: Wagner, R. A., & Fischer, M. J., "The string-to-string correction problem", 1974, Journal of the ACM (JACM), 21(1), 168-173

NPL 6: Myers, G., "A fast bit-vector algorithm for approximate string matching based on dynamic programming", 1999, Journal of the ACM (JACM), 46(3), 395-415.

NPL 7: Gentry C., Halevi S., Smart N. P., "Homomorphic Evaluation of the AES Circuit.", 2012, In: Safavi-Naini R., Canetti R. (eds) Advances in Cryptology—CRYPTO 2012. CRYPTO 2012. Lecture Notes in Computer Science, vol 7417. Springer, Berlin, Heidelberg NPL 8: Cheon, J. H., Kim, M., & Lauter, K., "Homomorphic computation of edit distance.", 2015, In International Conference on Financial Cryptography and Data Security (pp. 194-212). Springer Berlin Heidelberg.

NPL 9: Hikaru Tsuchida, Toshinori Araki, Kazuma Ohara and Furukawa Jun, "Protection of Biometric and Genetic Information via Maliciously-Secure Multiparty Computation", 2018 Symposium on Cryptography and Information Security, Niigata, Japan, 2018, 2A1-5.

NPL 10: Kazuma Ohara, Toshinori Araki, Hikaru Tsuchida and Furukawa Jun, "Different-Sized Rings Mixed Maliciously-Secure Multiparty Computation", 2018 Symposium on Cryptography and Information Security, Niigata, Japan, 2018, 2A1-4.

NPL 11: Toshinori Araki, Jun Furukawa, Yehuda Lindell, Ariel Nof, and Kazuma Ohara, "High-Throughput Semi-Honest Secure Three-Party Computation with an Honest Majority.", 2016, In Proceedings of the 2016 ACM SIGSAC Conference on Computer and Communications Security (CCS '16). ACM, New York, NY, USA, 805-817.

NPL 12: T. Araki et al., "Optimized Honest-Majority MPC for Malicious Adversaries—Breaking the 1 Billion-Gate Per Second Barrier", 2017, IEEE Symposium on Security and Privacy (SP), San Jose, California, USA, 2017, pp. 843-862.

NPL 13: Xiao Shaun Wang, Yan Huang, Yongan Zhao, Haixu Tang, XiaoFeng Wang, and Diyue Bu., "Efficient Genome-Wide, Privacy-Preserving Similar Patient Query based on Private Edit Distance.", 2015, In Proceedings of the 22nd ACM SIGSAC Conference on Computer and Communications Security (CCS '15). ACM, New York, NY, USA, 492-503.

NPL 14: Aziz, Md Momin Al, Dima Alhadidi and Noman Mohammed, "Secure approximation of edit distance on genomic data.", 2017, BMC Medical Genomics (2017).

NPL 15: Asharov, Gilad, Shai Halevi, Yehuda Lindell and Tal Rabin., "Privacy-Preserving Search of Similar Patients in Genomic Data.", 2017, IACR Cryptology ePrint Archive 2017 (2017): 144.

NPL 16: Benny Pinkas, Thomas Schneider, Gil Segev, and Michael Zohner., "Phasing: private set intersection using permutation-based hashing.", 2015, In Proceedings of the 24th USENIX Conference on Security Symposium (SEC'15), Jaeyeon Jung (Ed.). USENIX Association, Berkeley, CA, USA, 515-530.

NPL 17: Fickett J W, "Fast optimal alignment.", Nucleic Acids Research, 1984; 12(1 Pt 1):175-179.

SUMMARY

As described above, a secret calculation (secure computation) has an advantage that a predetermined operation result can be obtained while keeping input data secret. On the other hand, there is a characteristic that communication between servers is necessary for a multiplication of secret shared input data (share information), whereby it takes relatively long time to obtain an operation result. According to the characteristic of such secret calculation, intolerable long processing time may be necessary or it may be necessary to reduce operation precision. In calculations of the edit distance as exemplified above, it is treated in such a manner that a calculation is performed with a reduced precision to improve processing performance (processing speed).

However, in an application such as calculating an edit distance of DNA sequence, a result of a calculation with a reduced precision may be treated to be of low value. That is, a result of an operation with a reduced precision (an edit distance with a low precision) may be inappropriate data for a user (for example, medical personnel). On the other hand, if time to obtain accurate operation result (an edit distance with high precision) is too long, it causes a problem for operations of a user. In this respect, the technology in NPL 2 and so on described above have a problem that a processing performance is low, or operation precision is sacrificed to increase operation performance and so on. Thus, many existing technologies require considerable calculation time or calculation time is shortened by sacrificing an accurate distance calculation.

It is a main object of the present invention to provide an information processing apparatus, a secret calculation method, and a program which can contribute to perform a predetermined processing by a secret calculation accurately and at high speed.

According to a first aspect of the present invention or the disclosure, there is provided an information processing apparatus, wherein, when an absolute value of a difference value between a first share and a second share which are secret-shared is less than or equal to a natural number t, the information processing apparatus calculates the difference value between the first share and the second share and performs a comparison in magnitude of the first share and the second share using bit-decomposition from a least significant bit to an m-th bit (m being a natural number) of the difference value.

According to a second aspect of the present invention or the disclosure, there is provided a secret calculation method, comprising: in an information processing apparatus, when an absolute value of a difference value between a first share and a second share which are secret-shared is less than or equal to a natural number t, calculating the difference value between the first share and the second share, and performing a comparison in magnitude of the first share and the second share using bit-decomposition from a least significant bit to an m-th bit (m being a natural number) of the difference value.

According to a third aspect of the present invention or the disclosure, there is provided a program that causes a computer to execute processings, comprising: when an absolute value of a difference value between a first share and a second share which are secret-shared is less than or equal to a natural number t, calculating the difference value between the first share and the second share, and performing a comparison in magnitude of the first share and the second share using bit-decomposition from a least significant bit to an m-th bit (m being a natural number) of the difference value. It is to be noted that this program can be recorded on a computer-readable storage medium. The storage medium can be non-transient one, such as a semiconductor memory, a hard disk, a magnetic recording medium, an optical recording medium, and so on. The present invention can be implemented as a computer program product.

According to respective aspects of the present invention or the disclosure, an information processing apparatus, a secret calculation method, and a program which can contribute to perform a predetermined processing by a secret calculation accurately and at high speed are provided.

BRIEF DESCRIPTION OF DRAWINGS

FIGS. 3A to 3D are a diagram illustrating a calculation of an edit distance, respectively.

FIG. 11 is a diagram illustrating an example of a communication cost required for an edit distance calculation by various schemes.

PREFERRED MODES

First, an outline of an example will be described. Note, in the following outline, reference signs of the drawings are denoted to each element as an example for the sake of convenience to facilitate understanding and description of this outline is not intended to any limitation. An individual connection line between blocks in drawings and so on referred to in the following description includes both one-way and two-way directions. A one-way arrow schematically illustrates a principal signal (data) flow and does not exclude bidirectionality. Furthermore, while not illustrated, an input port(s) and an output port(s) exist respectively at connection point of input/output of each connection line, in circuit diagrams, block diagrams, internal configuration diagrams and connection diagrams, and so on disclosed herein. The same applies to the input/output interfaces.

Figure 1:
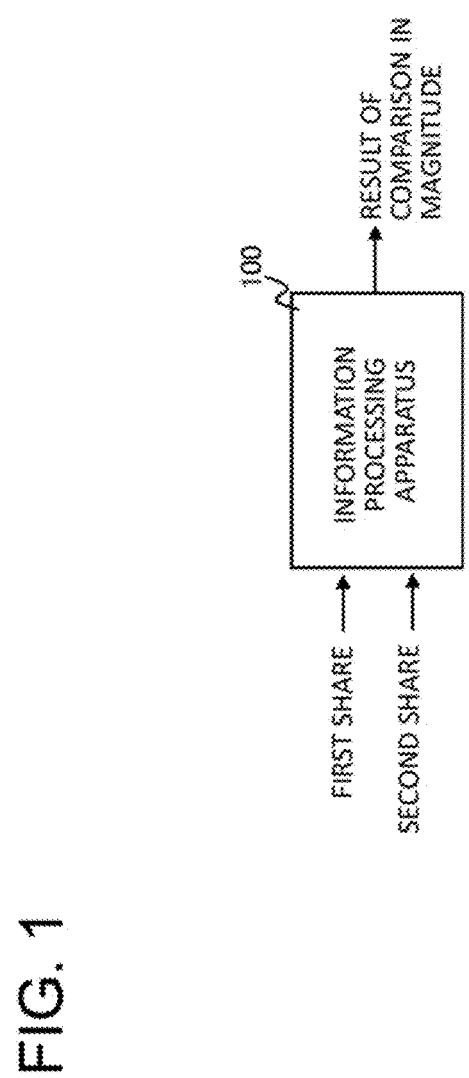
FIG. 1 is a diagram illustrating an outline of an example embodiment.

An information processing apparatus 100 according to an example embodiment as shown in FIG. 1, when an absolute value of a difference value between a first share and a second share which are secret-shared is less than or equal to a natural number t, calculates the difference value between the first share and the second share. Furthermore, the information processing apparatus 100 performs a comparison in magnitude of the first share and the second share using bit-decomposition from a least significant bit to an m-th bit (m being a natural number) of the difference value.

Although details will be described later, with respect to a comparison in magnitude of shares which are secret-shared, a result can be obtained more easily by a processing of a logical operation than by that of a numerical operation. Therefore, when the above information processing apparatus 100 performs a comparison in magnitude of shares which are secret shared, it converts a difference value of two shares to a binary number. However, because information which is a target of a comparison in magnitude is information (numerical value) which are secret-shared, a technology called "bit-decomposition" disclosed in NPL 10 and so on is necessary to convert the numerical value which is secret-shared into a binary number. The bit-decomposition is performed on a bit value of a value which is secret-shared (a value of each digit in binary notation) from a least significant bit to a most significant bit in sequence. As a result of enthusiastic studies about the bit-decomposition by applicants of the present invention, the applicants gained a new insight that it is possible to determine a comparison in magnitude of two shares (positive or negative of a difference value) without calculating values for all bits in a case where a predetermined condition is satisfied. Concretely, if it is known in advance that an absolute value of a difference value between two shares is less than or equal to a predetermined number (the above natural number t), it has turned out to be clear that it is not necessary to perform the bit-decomposition of the difference value up to a most significant bit. Although details will be described later, the above condition is satisfied with respect to an edit distance between two character strings. When a comparison in magnitude of two shares is performed, the information processing apparatus 100 realizes to speed-up processing by a secret calculation by restricting the bit-decomposition whose communication cost is relatively large to a decomposition up to a necessary minimum bit (the above m-th bit). Furthermore, even if the bit-decomposition is restricted up to an intermediate bit, a result of a comparison in magnitude is not affected, whereby precision of a processing result including the comparison in magnitude does not decrease at all.

Hereinafter, a concrete example embodiment will be described in more detail with reference to drawings. Please note that, in each example embodiment, the same reference signs are denoted to the same constituent elements and explanation thereof will be omitted.

[First Example Embodiment]

A first example embodiment will be described in more detail with reference to drawings.

As described above, there is a medical field as an application area of a secret calculation. For example, as a processing in which an edit distance calculation is used as a subroutine, fuzzy search of a database may be exemplified. In this case, if limited people of a medical organization only access a database, latency is more important than throughput. Furthermore, in the case of genomic medicine, it is assumed that genomic information managed in each country around the world is used due to differences in race and region. However, considering General Data Protection Regulation and so on which has begun to be put into effect in Europe, it is assumed that it will become to be a more difficult situation to transfer personal information such as genomic information to outside of a country. For this reason, it is considered that a secret calculation will be performed using genomic information between servers in each country. In this case, because communication is performed among servers located in each country, there is high probability that communication delay may increase.

In many secret calculation protocols, for implementation, TCP (Transmission Control Protocol) communication is required. TCP communication has a characteristic that a next packet cannot be transmitted unless a response is obtained from a communication partner. Therefore, even if communication band range is expanded, improvement of performance may not be obtained as expected when communication delay is large. Therefore, a method to reduce the number of communication rounds is particularly necessary.

In the first example embodiment, there is provided a secret calculation system which, by focusing on the number of the communication rounds, realizes improvement of the number of the communication rounds in order to perform an accurate edit distance calculation using a secret calculation at high speed. Owing to the secret calculation system according to the first example embodiment, an accurate edit distance calculation using a secret calculation and effect of improvement of performance with regard to processing(s) of high-order using the edit distance calculation as a subroutine are expected.

[System Configuration]

Figure 2:
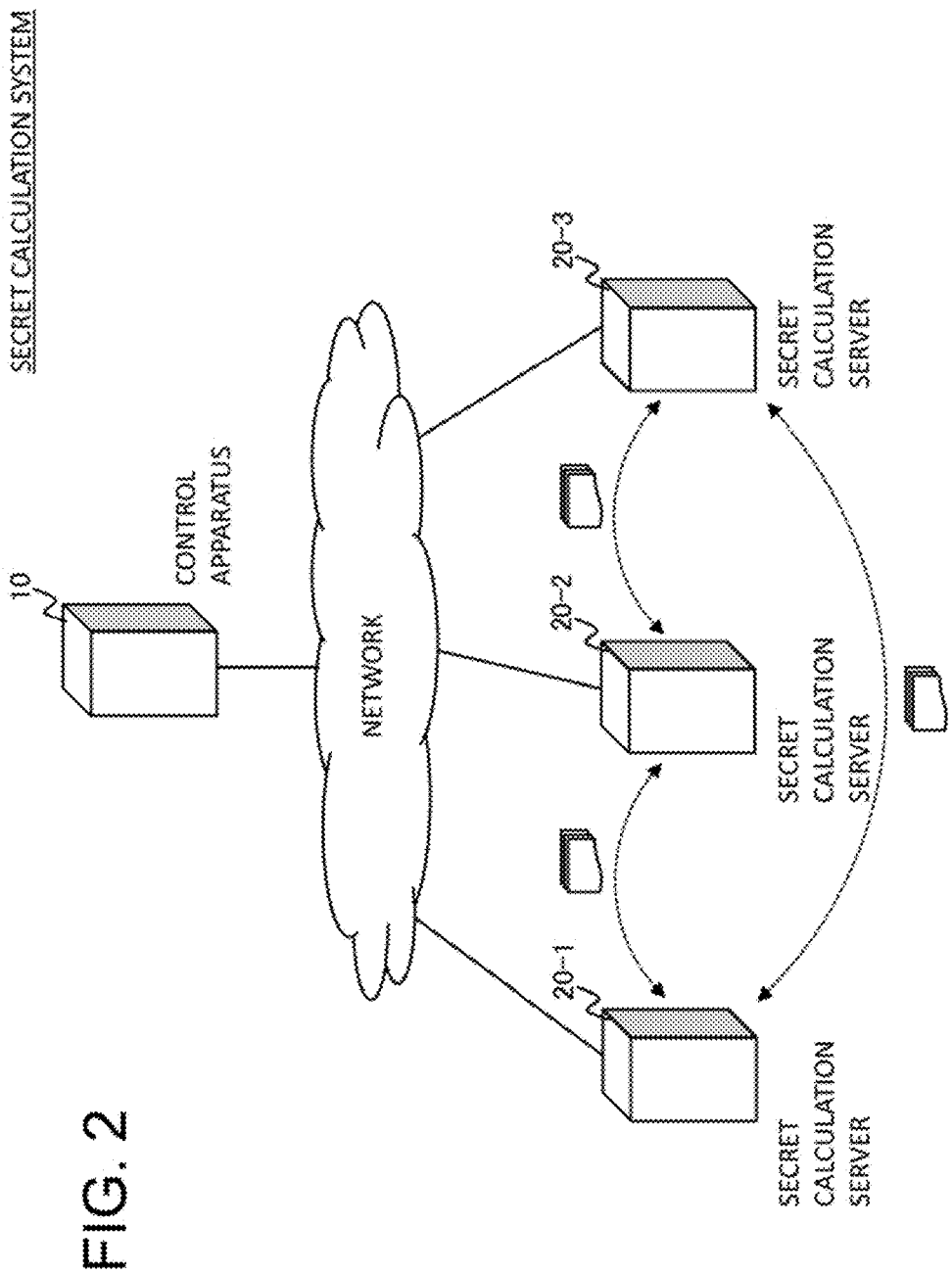
FIG. 2 is a diagram illustrating an example of an outline configuration of a secret calculation system according to a first example embodiment.

FIG. 2 is a diagram illustrating an example of an outline configuration of a secret calculation system according to the first example embodiment. With reference to FIG. 2, the secret calculation system is configured to include a control apparatus 10 and a plurality of secret calculation servers 20-1 to 20-3. Each apparatus as shown in FIG. 2 is connected to each other and configured to be able to transmit and receive data each other. Please note that in the following description, if there is no particular reason to distinguish the secret calculation servers 20-1 to 20-3, there will be simply denoted as a "secret calculation server 20". Furthermore, the system configuration as shown in FIG. 2 is an example and it is, of course, not intended to limit the number of the secret calculation servers 20 and so on.

The control apparatus (controller) 10 is an apparatus to control the secret calculation servers 20. Concretely, the control apparatus 10 controls input/output of data to/from each secret calculation server 20.

The secret calculation server 20 is a server to perform a secret calculation. The secret calculation server 20 receives input data (data to be secret-shared) from the control apparatus 10. Each secret calculation server 20 performs a predetermined processing using the above input data in cooperation with other servers. The secret calculation server

20 transmits a calculation result to the control apparatus 10. Otherwise, the secret calculation server 20 may transmit a calculation result to an external apparatus different from the control apparatus 10.

The secret calculation system as shown in FIG. 2 calculates an edit distance with respect to two DNA sequences. The control apparatus 10 secret-shares the two DNA sequences for which an edit distance is to be calculated, and transmits secret-shared data to each secret calculation server 20.

Each secret calculation server 20 obtains input data (share information; secret-shared DNA sequences) and performs a secret calculation with respect to a calculation of the edit distance. When performing a secret calculation in each secret calculation server 20 is finished, the control apparatus 10 collects calculation results from each secret calculation server 20, and performs decoding of the calculation results. Please note that, in the first example embodiment, although the DNA sequences are calculation targets of an edit distance, other character strings, of course, may be calculation targets of an edit distance.

[Calculation of Edit Distance]

First, an outline of a calculation of an edit distance will be described.

It is possible to use WF (Wagner-Fischer) method as described in NPL 5 for a calculation of an edit distance. Hereinafter, the calculation of an edit distance by the Wagner-Fischer method will be concretely described. At this time, let character strings of targets be $p=(p_1, p_2, p_3)$ and $s=(s_1, s_2, s_3)$.

Figures 3A, 3B, 3C, 3D:
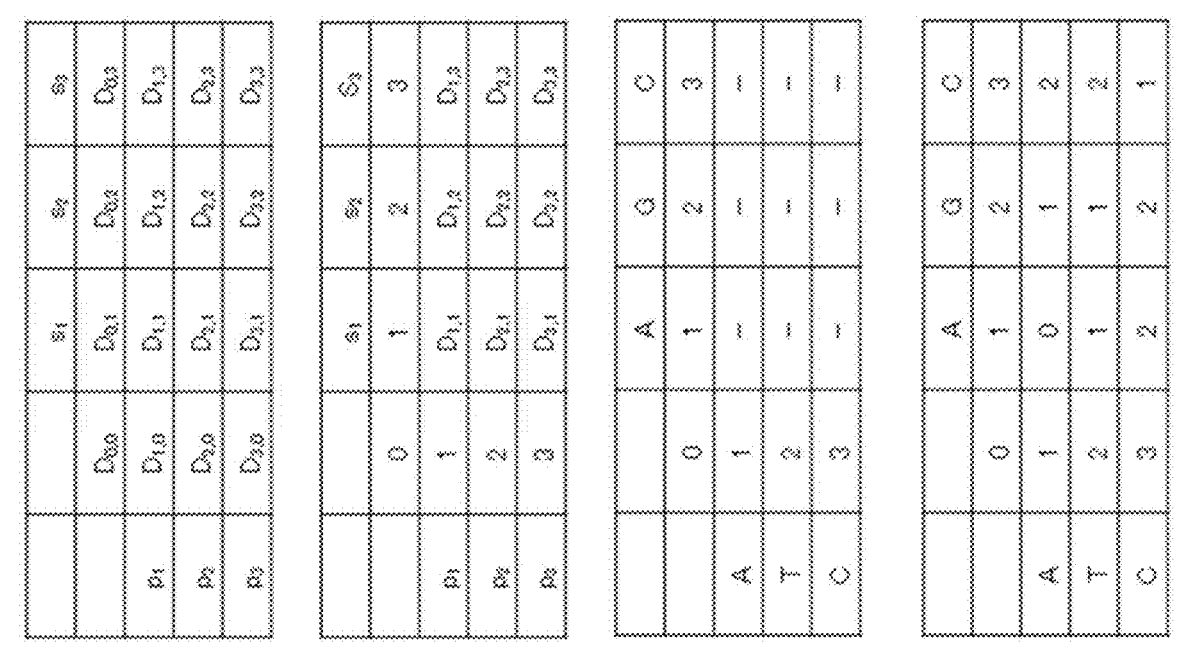

First, a DP matrix is generated. In the above example, the DP matrix as shown in FIG. 3A is generated. As shown in FIG. 3A, if the number of characters included in character strings to be compared is k (k is a natural number, the same applies hereinafter), a DP matrix having k+1 rows and k+1 columns is generated. In the above example, because the number of characters included in two character strings is "3 (three)", a matrix having 4 rows and 4 columns is generated.

Next, scores of the DP matrix are initialized. A value (score) corresponding to each element of the DP matrix is denoted by $D_{i,j}$. Here, i is an index in a row direction of the DP matrix and j is an index in a column direction of the DP matrix. Initialization of the scores of the DP matrix is performed by setting to be $D_{i,0}=i$ and $D_{0,j}=j$ (refer to FIG. 3B).

Next, a score of each element in the DP matrix is calculated. For a calculation of a score, values corresponding to three elements on the basis of an element for which the score is to be calculated, are calculated. A minimum value among the three calculated values becomes a score of a target to be calculated.

A first calculation value is a value which is obtained by adding "1" to a score of an element one above (an element whose index in a column direction is smaller by 1 (one) than) the element for which a score is to be calculated.

A second calculation value is a value which is obtained by adding "1" to a score of an element at the one left of (an element whose index in a row direction is smaller by 1 (one) than) the element for which a score is to be calculated.

A third calculation value is a value which is obtained by adding "C" to a score of an element at the upper left of (an element whose indexes in a row direction and a column direction are respectively smaller by 1 (one) than) the element for which a score is to be calculated. Here, if characters corresponding to the element for which a score is to be calculated (characters in a row direction and in a vertical direction) match, it is set to be C=0. If characters corresponding to the element for which a score is to be calculated (characters in a row direction and in a vertical direction) do not match, it is set to be C=1.

For example, let character strings to be compared be "AGC" and "ATG", an DP matrix after initialization becomes to be one as shown in FIG. 3C. With respect to these character strings, when a calculation to set a minimum value among the above three calculation values to a score is repeated, a result shown in FIG. 3D is obtained. An edit distance is a score at the bottom right of the DP matrix ($D_{3,3}$). In an example as shown in FIG. 3C and FIG. 3D, the edit distance becomes to be "1 (one)".

In the secret calculation system of the first example embodiment, the calculation of an edit distance as described above is performed by a secret calculation.

[Notation]

Next, a notation will be defined.

A residue class ring modulo 2 is notated as below.
$\mathbb{Z}_2$

A residue class ring modulo $2^n$ is notated as below (n is a natural number, the same applies hereinafter).
$\mathbb{Z}_{2^n}$ A share belongs to a residue class ring modulo 2
$w \in \mathbb{Z}_2$
is notated as [w].

A share belongs to a residue class ring modulo $2^n$
$v \in \mathbb{Z}_{2^n}$
is notated as $[v]^n$.

Please note that [w] is also called a bit share and $[v]^n$ is also called a ring share.

Let an addition operator be denoted as "+" and let a multiplication operator be denoted as "·" for bit shares and ring shares which satisfy four expressions as described below.

$[v_1]^n + [v_2]^n = [v_1 + v_2]^n$ $[v_1]^n \cdot [v_2]^n = [v_1 \cdot v_2]^n$ $c \in \mathbb{Z}_{2^n}, c + [v]^n = [c+v]^n$ $c \in \mathbb{Z}_{2^n}, c \cdot [v]^n = [c \cdot v]^n$ Among the four expressions, each secret calculation server 20 can solely calculate with respect to a first expression, a third expression and a fourth expression (it is possible to calculate locally; communication with other server is not necessary). On the other hand, with respect to a second expression, it is necessary to communicate with other secret calculation servers 20 for a calculation thereof. For example, a secret calculation method as disclosed in NPL 11 requires communication traffic of 3n bits and one communication round.

Left sides of the above four expressions intend secret calculations corresponding to operators to which respective shares are input. In the following description, notations by the above operators "+" and "·" are used for secret calculations with respect to an addition and a multiplication for facilitating understanding.

[Bit-Decomposition]

In the secret calculation system according to the first example embodiment, a calculation called "bit-decomposition" as disclosed in NPL 10 is used for an edit distance calculation. Hereinafter, an outline of the bit-decomposition disclosed in NPL 10 will be described.

The bit-decomposition is a processing to convert shared information for a numerical calculation into shared information for a logical operation. That is the bit-decomposition is a processing to convert a secret-shared value from a decimal share to a binary share in the secret calculation protocol. For example, a case where an integer "5" as modulo 8 ($2^3$) is shared among three secret calculation servers 20 is considered. In this case, for example, "5" is shared in such a manner that r1=1, r2=2, and r3=2, and the secret calculation server 20-1 stores (r1, r2), the secret calculation server 20-2 stores (r2, r3), and the secret calculation server 20-3 stores (r3, r1). Using the bit-decomposition, shared information for each bit of "0101" which is binary notation of a value "5" is obtained from these shared information.

Concretely, when bit-decomposition is performed for an integer "5", each secret calculation server 20 becomes to possess, for example, the following information.
<The Secret Calculation Server 20-1>
0th bit: (r1, r2)=(1, 1)
1st bit: (r1, r2)=(0, 1)
2nd bit: (r1, r2)=(1, 0)
3rd bit: (r1, r2)=(0, 0)
<The Secret Calculation Server 20-2>
0th bit: (r2, r3)=(1, 1)
1st bit: (r2, r3)=(1, 1)
2nd bit: (r2, r3)=(0, 0)
3rd bit: (r2, r3)=(0, 0)
<The Secret Calculation Server 20-3>
0th bit: (r3, r1)=(1, 1)
1st bit: (r3, r1)=(1, 0)
2nd bit: (r3, r1)=(0, 0)
3rd bit: (r3, r1)=(0, 0)

As to a result the above bit-decomposition, when focusing on the 0th bit (a least significant bit), because of r1=r2=r3=1, it becomes to be r1+r2+r3 mod 2=1, whereby it matches a value of the least significant bit of a binary notation of 5. Similarly, when focusing on the 1st bit, because of r1=0, r2=1, and r3=1, it becomes to be r1+r2+r3 mod 2=0, whereby it matches a value of the first bit of a binary notation of 5. Please note that "a mod b" represents a remainder when an integer a is divided by an integer b.

In the present disclosure, a processing for decomposing a ring share $[v]^n$ into m bit shares (m is an integer less than or equal to n−1, the same applies hereinafter) is denoted as an expression (1) below.

$$([v|_j])_{j=0,\ldots,m} \leftarrow \text{decomp}([v]^n) \qquad \text{[expression (1)]}$$

Please note that when
$v \in \mathbb{Z}_{2^n}$
is denoted by a binary number, j(=0, 1, . . . , n−1)-th bit is denoted by
$v|_j \in \mathbb{Z}_2$.

There are various methods for the bit-decomposition, in the present disclosure, bit-decomposition disclosed in NPL 10 is used. Although detailed description as to a calculation method (algorithm) of the bid-decomposition disclosed in NPL 10 is omitted, in the bit-decomposition by this literature, information to be shared among each secret calculation server 20 is calculated from a least significant bit in sequence.

With respect to a communication cost required for a calculation of the bit-decomposition, if the bit-decomposition is performed by a scheme disclosed in NPL 10 using disclosure of NPL 11, communication traffic of 6(n−1) bits and n−1 communication rounds are required.
[Bit-Embedding]

In the secret calculation system according to the first example embodiment, a calculation called "bit-embedding" disclosed in NPL 10 is used for an edit distance calculation.

The bit-embedding is a processing to convert a bit share of [b] to a ring share $[b]^n$. In the present disclosure, the bit-embedding is denoted as an expression (2) below.

$$[b]^n \leftarrow \text{inj}([b]) \qquad \text{[expression (2)]}$$

Although there are also various calculation methods with respect to the bit-embedding, in the present disclosure, the bit-embedding processing disclosed in NPL 10 is used. Because processings with respect to the bit-embedding are clear for those skilled in the art from NPL 10, detailed description as to a calculation method (algorithm) of the bid embedding disclosed in this literature is omitted.

With respect to a communication cost required for a calculation of the bit-embedding, if the bit-embedding is performed by a scheme disclosed in NPL 10 using disclosure of NPL 11, communication traffic of 6n bits and 2 communication rounds are required.

Next, each apparatus making up a secret calculation system will be described.
[Control Apparatus]

Figure 4:
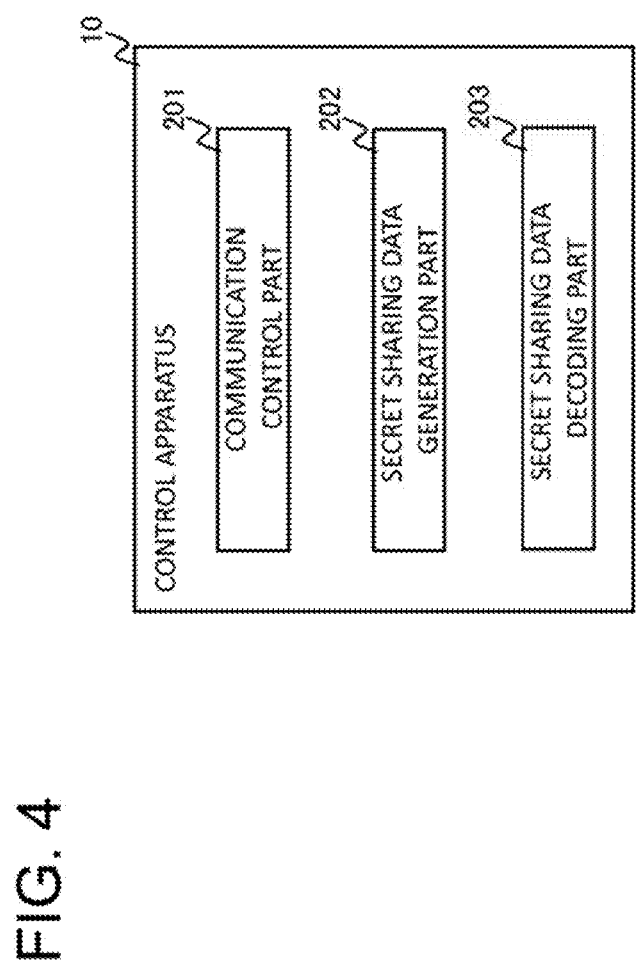
FIG. 4 is a diagram illustrating an example of a processing configuration of a control apparatus according to the first example embodiment.

FIG. 4 is a diagram illustrating an example of a processing configuration of a control apparatus 10 according to the first example embodiment. With reference to FIG. 4, the control apparatus 10 is configured to include a communication control part 201, a secret sharing data generation part 202, and a secret sharing data decoding part 203.

The communication control part 201 is facilities which control communication between other apparatus (a secret calculation server 20).

The secret sharing data generation part 202 is facilities which generate shares to be distributed to each secret calculation server 20. Concretely, the secret sharing data generation part 202 randomly generates $s_1$, $s_2$, and $s_3$ which satisfy $S = s_1 + s_2 + s_3$ mod N for secret information S (DNA sequence). Please note that N is a power-of-2 ($N=2^n$). The shares generated are distributed to each secret calculation server 20 through the communication control part 201. At this time, the secret sharing data generation part 202, for example, transmits two shares to one secret calculation server 20.

The secret sharing data decoding part 203 is facilities which collect calculation results by each secret calculation server 20 and restore.
[Secret Calculation Server]

Figure 5:
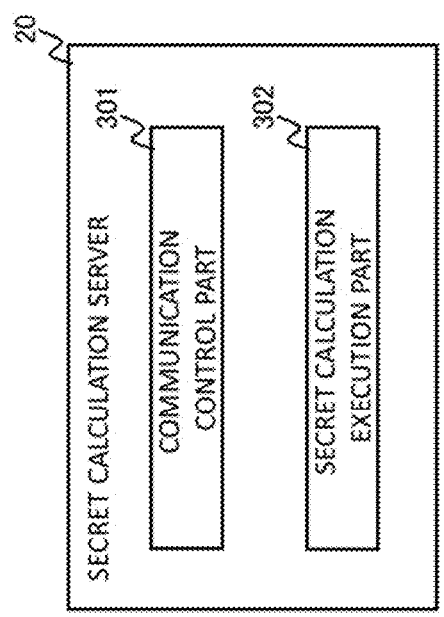
FIG. 5 is a diagram illustrating an example of a processing configuration of a secret calculation server according to the first example embodiment.

FIG. 5 is a diagram illustrating an example of a processing configuration of the secret calculation server 20 according to the first example embodiment. With reference to FIG. 5, the secret calculation server 20 is configured to include a communication control part 301 and a secret calculation execution part 302.

The communication control part 301 is facilities which control communication with other apparatus (a control apparatus 10, other secret calculation server 20).

The secret calculation execution part 302 is facilities which perform a predetermined secret calculation. Concretely, the secret calculation execution part 302 performs calculation of an edit distance with respect to two DNA sequences. The secret calculation execution part 302 performs the secret calculation according to a secret calculation execution code provided from an external apparatus (for example, the control apparatus 10)

Please note that, the following description is on the basis of an operation of the secret calculation execution part 302 in a single secret calculation server 20, in practice, the secret calculation execution parts 302 of three secret calculation servers 20 cooperate to perform a calculation of the above edit distance.

Figure 6:
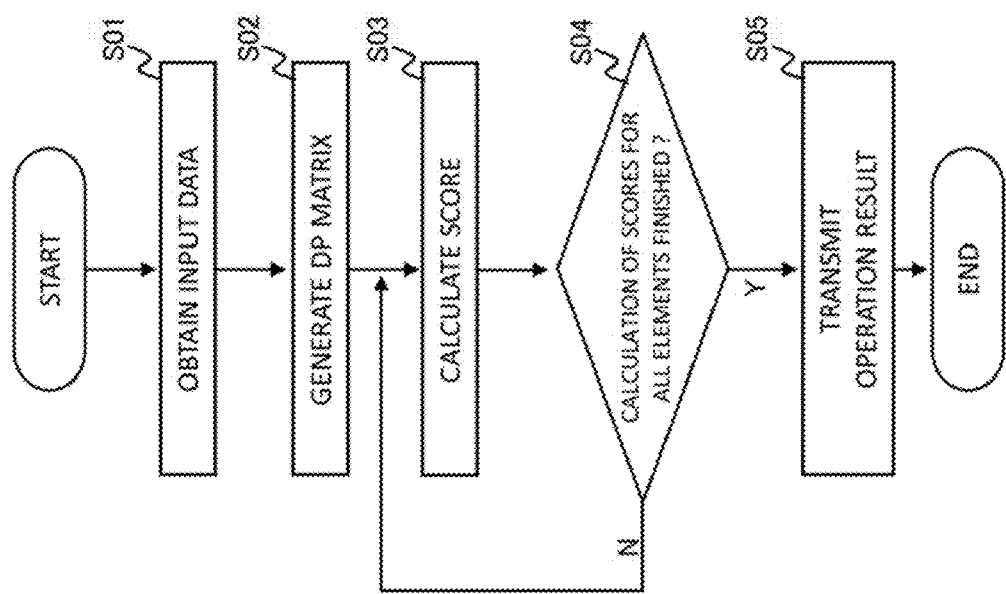
FIG. 6 is a flowchart illustrating an example of an operation of a secret calculation execution part.

FIG. 6 is a flowchart illustrating an example of an operation of the secret calculation execution part 302.

The secret calculation execution part 302 obtains secret-shared input data (two DNA sequences) through the communication control part 301 (step S01).

The secret calculation execution part 302 generates a DP matrix (for example, refer to FIGS. 3A to 3D) according to the number of characters included in the obtained two DNA sequences (step S02). At this time, the secret calculation execution part 302 performs initialization of the DP matrix.

After the initialization of the DP matrix is finished, the secret calculation execution part 302 calculates a score of each element of the DP matrix (step S03). A score calculation processing of each element of the DP matrix will be described in detail later.

The secret calculation execution part 302 confirms whether or not score calculations for all the elements is finished (step S04). If the calculation of the scores for all the elements is finished (step S04, Yes branch), the secret calculation execution part 302 performs a processing of step S05. If the calculation of the scores for all the elements is not finished (step S04, No branch), the secret calculation execution part 302 repeats the processing of step S03.

The secret calculation execution part 302 transmits a secret-shared operation result to the control apparatus 10 (step S05).

Next, with reference to FIG. 7, operation to calculate a score for each element of the DP matrix in the secret calculation execution part 302 will be described. Please note that, for explaining the score calculation operation by the secret calculation execution part 302, a part of the DP matrix as shown in FIG. 8 is referred to. In FIG. 8, a bottom right cell (a score is $D_{i,j}$) is a target for which a score is to be calculated.

The secret calculation execution part 302 determines whether or not characters assigned in a row direction (horizontal direction) and in a column direction (vertical direction) of the element (the bottom right cell as shown in FIG. 8) for which a score is to be calculated match each other (step S101).

If the characters match (step S101, Yes branch), the secret calculation execution part 302 adds "1 (one)" to the score $D_{i-1,j-1}$ of the upper left element (step S102). If the characters do not match (step 101, No branch), the secret calculation execution part 302 does not perform a particular processing and performs processings on and after step S103.

The secret calculation execution part 302 adds "1 (one)" to scores $D_{i,j-1}$ and $D_{i-1,j}$ of elements at the left of and above the element for which a score is to be calculated (step S103).

The secret calculation execution part 302 performs a comparison in magnitude of scores of elements at the left of and above (elements on a diagonal) the element for which a score is to be calculated (step S104).

At this time, the secret calculation execution part 302 performs a comparison in magnitude of two scores using the bit-decomposition as described above. This is because when a comparison in magnitude is performed in a state where two scores are secret-shared, a result can be obtained more easily by performing a logical operation than by performing a numerical operation. Concretely, if a difference value of two numerical values is represented in binary notation, positive or negative of the difference value (which of comparison targets is larger) can be easily obtained according to a value of a most significant bit.

The secret calculation execution part 302 performs a comparison in magnitude of two scores using the bit-decomposition due to the above reason.

[Restricted Comparison in Magnitude]

At the time when a processing of the above bit-decomposition is performed, the secret calculation execution part 302 does not decompose all the bits of a difference value between two scores and stops the processing at the time when the bit-decomposition up to a predetermined digit (a predetermined bit number) is completed.

For example, if a difference value is a numerical value which can be represented with 4 (four) bits (for example 5; binary notation is 0101), in a normal bit-decomposition, the bit-decomposition is performed from a least significant bit (0-th bit) in sequence and the processing is stopped at the time when the bit-decomposition of a most significant bit (3-rd bit) is completed. In place of the normal bit-decomposition as above, the secret calculation execution part 302 performs a processing to stop the bit-decomposition of the numerical value which can be represented with the above 4 bits, for example, at the time when the bit-decomposition up to the first bit is ended.

The secret calculation execution part 302 performs a comparison in magnitude of two scores using a result of the bit-decomposition performed up to a halfway bit in this way. Please note that, in the following description, a processing in which, for each of two scores, the bit-decomposition is performed up to a predetermined bit and a comparison in magnitude is performed using results of the bit composition halfway, is denoted as "a restricted comparison in magnitude".

The reason why the restricted comparison in magnitude can be applied to the calculation of an edit distance is as below.

According to NPL 6, if a replacement cost, an insertion cost, and a deletion cost are "1 (one)" respectively, a difference of scores between adjacent elements each other excluding between elements of above and at the left of the element for which a score is to be calculated in a DP matrix, is any one of "1", "0", or "−1". When this fact is applied to a DP matrix as shown in FIG. 8, relationships denoted by five expressions as below are obtained.

$$|D_{i,j}-D_{i,j-1}|\leq 1$$

$$|D_{i,j}-D_{i-1,j}|\leq 1$$

$$|D_{i-1,j}-D_{i-1,j-1}|\leq 1$$

$$|D_{i,j-1}-D_{i-1,j-1}|\leq 1$$

$$|D_{i,j}-D_{i-1,j-1}|\leq 1$$

These relationships represent to become $|v-v'|\leq 1$ for a difference between inputs $v-v'$ when a comparison in magnitude between two scores $[v<?v']^n$ is performed by a secret calculation. Please note that the above "<?" represents a comparison in magnitude of shares which are secret-shared.

Furthermore, when focusing on the elements on the diagonal of above and at the left of a target to which a scores it to be calculated, because possible values of these difference values are "−2", "−1", "0", "1", or "2", it becomes to be $|v-v'|\leq 2$ for the difference between the inputs $v-v'$. When this fact is applied to the DP matrix as shown in FIG. 8, a relationship denoted by an expression as below is obtained.

$$|D_{i,j-1}-D_{i-1,j}|\leq 2$$

As described above, if $|v-v'| \leq 1$ is satisfied, the following relationship holds irrespective of values v, v' which are targets of a comparison in magnitude.

$$v-v'=0=000\ldots00_{(2)}$$

$$v-v'=1=000\ldots01_{(2)}$$

$$v-v'=-1=111\ldots11_{(2)}$$

Please note that a suffix (2) used in the above three equations represents that a figure is represented in binary notation. Furthermore, targets of a comparison in magnitude are assumed to be a numerical value of 32 bits.

If the relationship of $|v-v'| \leq 1$ is satisfied from the above three equations, when a comparison in magnitude of the two input values v, v' are performed by the secret calculation, it can be understood that it is sufficient to obtain information up to the first bit (the 2-nd bit from the right). That is, in case where a comparison in magnitude of the two input values v, v' are performed by the secret calculation, if the relationship $|v-v'| \leq 1$ is satisfied, it is sufficient to perform a comparison in magnitude using a result of the bit-decomposition up to the first bit of a different value.

If targets of a comparison in magnitude are scores of elements on a diagonal (between two elements of above and at the left of the target for which a score is to be calculated), because the relationship of $|v-v'| \leq 2$ is satisfied, the bit-decomposition up to the second bit of a difference between two shares becomes necessary.

The restricted comparison in magnitude as described above is summarized as below.

Let shares (secret-shared inputs) to be compared be $[v]^n$ and $[v']^n$. That is, the two shares are respectively shares belonging to a residue class ring modulo $2^n$.

A relationship of a following expression (3) holds between the two shares to be compared.

$$|v-v'| \leq t \qquad \text{[expression (3)]}$$

where, a relationship of $0 \leq v, v' < 2^n$, $t < 2^{n-1}$ holds.

Under a premise that above conditions are satisfied, the restricted comparison in magnitude is represented as an expression (4) below.

$$[v <_r v']^n = \begin{cases} [1] & (v < v') \\ [0] & (\text{else}) \end{cases} \qquad \text{[expression (4)]}$$

where "$<_r$" represents a restricted comparison in magnitude in the above expression (4).

As shown in the expression (4), an output result of a restricted comparison in magnitude is "1" if the sign of inequality is satisfied, and is "0" if the sign of inequality is not satisfied.

Please note that a bit up to which it is necessary to perform bit-decomposition can be obtained from t in the above expression (3). Concretely, m which satisfies a relationship of an expression (5) below, is a bit position of the bit-decomposition necessary for the restricted comparison in magnitude. That is, in the restricted comparison in magnitude, the bit-decomposition up to a m-th bit calculated from the expression (5) is necessary (the number of digits to be bit-decomposed is m+1).

$$2^{m-1} \leq t < 2^m \leq 2^{n-1} \qquad \text{[expression (5)]}$$

The secret calculation execution part 302 performs bit-decomposition according to an expression (6) below.

$$([(v-v')|_j])_{j=0,\ldots,m} \leftarrow \text{decomp}([v]^n - [v']^n) \qquad \text{[expression (6)]}$$

The secret calculation execution part 302 outputs a result $[(v-v')|_m]$ by the above expression (6) as a share of determination result. Please note that a communication cost required for the restricted comparison in magnitude is communication traffic of 6m bits and m communication rounds.

The difference between existing bit-decomposition and bit-decomposition of the present disclosure is summarized below.

In the existing bit-decomposition, the bit-decomposition up to n-th bit is performed under a condition of $0 \leq v, v' < 2^n$ and $|v-v'| < 2^n$. In this case, a communication cost is communication traffic of 6(n-1) bits and n-1 communication rounds.

In the bit-decomposition of the present disclosure, the bit-decomposition up to the m-th bit is performed under a condition of $0 \leq v, v' < 2^n$ and $|v-v'| \leq t$ ($2^{m-1} \leq t < 2^m \leq 2^{n-1}$). In this case, a communication cost is communication traffic of 6m bits and m communication rounds. Here, because the above t and m are values (public values) predetermined by a processing which uses bit-decomposition (application to be applied; for example, a calculation of an edit distance), the communication cost of bit-decomposition becomes a constant value that does not depend on n (a ring size).

Figure 7:
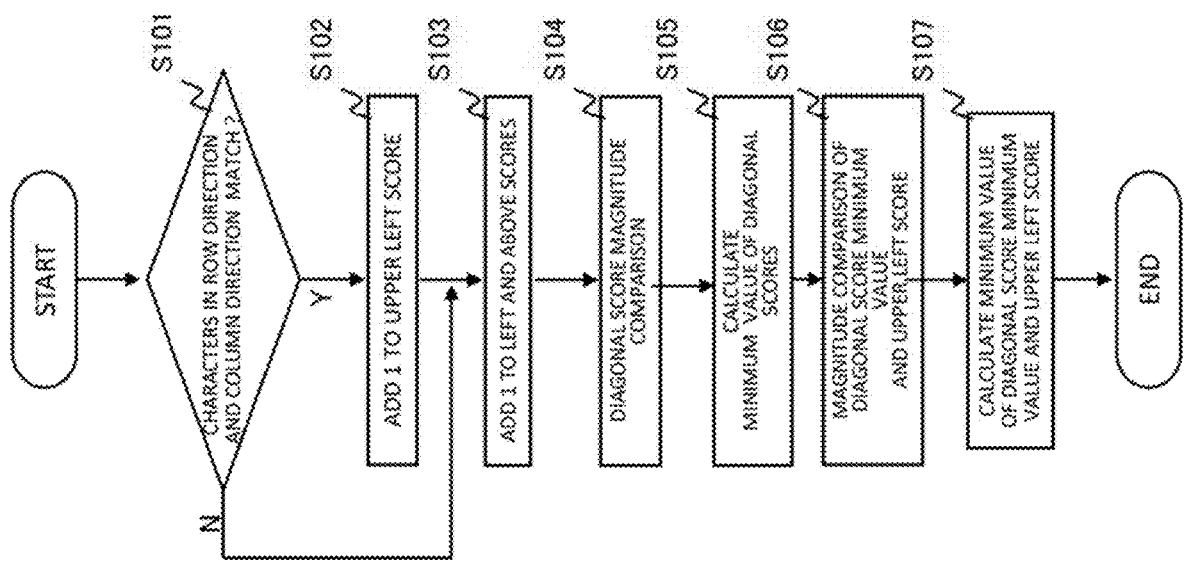
FIG. 7 is a flowchart illustrating an example of a score calculation operation by the secret calculation execution part.
Figure 8:
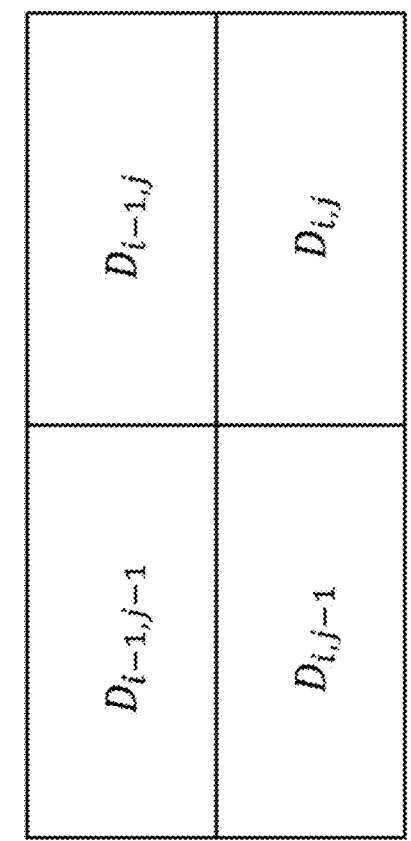
FIG. 8 is a diagram illustrating an operation of the secret calculation execution part.

Returning to the description to the calculation of the edit distance as shown in FIG. 7, as described above, the secret calculation execution part 302 performs a comparison in magnitude between scores for elements at the left of and above (i.e., elements on the diagonal) the element for which a score is to be calculated (step S104). Concretely, the secret calculation execution part 302 performs a restricted comparison in magnitude as shown in an expression (7) and obtains a determination result [i_or_d].

$$[i\_or\_d]=[D_{i,j-1}+1 <_r D_{i-1,j}+1]^n \qquad \text{[expression (7)]}$$

Please note that, as described above, because an absolute value of a difference between scores of elements on a diagonal is less than or equal to 2, t in the expression (5) is "2". According to the expression (5), if t=2, m becomes to be "2". Therefore, in case where a comparison in magnitude with respect to scores on the diagonal is performed, the secret calculation execution part 302 performs the bit-decomposition up to a second bit of a difference value between two scores and performs a comparison in magnitude.

Concretely, the secret calculation execution part 302 calculates a difference value between two scores to which 1 is added. The secret calculation execution part 302 performs bit-decomposition up to the second bit of the difference value. Thereafter, the secret calculation execution part 302 determines which of scores is greater according to a value of the second bit which is bit-decomposed. More concretely, if the second bit is "1", the difference value between the two scores represents a negative value, therefore, it is determined that the score $D_{i,j-1}+1$ is greater than the score $D_{i-1,j}+1$ in the expression (7). Therefore, if a value of the m-th bit which is obtained at the end of the bit-decomposition performed from a least significant bit in sequence is "1", it is determined that at least the score $D_{i,j-1}+1$ is greater than the score $D_{i-1,j}+1$. If a value of the m-th bit is "0", it is determined that the score $D_{i,j-1}+1$ is smaller than the score $D_{i-1,j}+1$ or both two scores are the same value. In this way, the secret calculation execution part 302 determines which one of the two shares is greater according to a value of the m-th bit of a difference value which is bit-decomposed.

In this case, a communication cost required for a comparison in magnitude of scores on the diagonal is communication traffic of 12 bits and 2 (two) communication rounds. In this way, the secret calculation execution part 302 performs a diagonal comparison in magnitude with respect to scores of respective elements located above and at the left of the element for which a score is to be calculated in a DP matrix used for the calculation of an edit distance, by the restricted comparison in magnitude.

Next, the secret calculation execution part 302 calculates a minimum value $[IorD]''$ of scores on a diagonal of a DP matrix (step S105). Concretely, the secret calculation execution part 302 calculates the minimum value $[IorD]''$ according to an expression (8) as below.

$$[IorD]''=\text{inj}([i\_or\_d])\cdot[D_{i-1,j-1}+1]''+\text{inj}([i\_or\_d\oplus 1])\cdot[D_{i-1,j}+1]''  \quad\text{[expression (8)]}$$

Please note that bit-embedding is used in the above expression (8). Because a calculation of a minimum value using the bit-embedding can be performed according to "selection of minimum and maximum" as described in "3. Example of numerical operation" in NPL 9, detailed description thereof will be omitted. In this case, a communication cost required for a calculation of a minimum value is communication traffic of 18n bits and three communication rounds in a case where a fraud (or malicious access) detection is not performed.

The secret calculation execution part 302 performs a comparison in magnitude between the minimum value on a diagonal $[IorD]''$ and a score of an upper left element (step S106). Also in the comparison in magnitude, the secret calculation execution part 302 performs a comparison in magnitude with respect to two inputs using a restricted comparison in magnitude.

In this case, as described above, because an absolute value of a difference between scores of adjacent elements is less than or equal to "1", t in the above expression (3) becomes to be "1". Because t is "1", there becomes to be m=1 according to the expression (5). Therefore, the secret calculation execution part 302 obtains a determination result by a restricted comparison in magnitude with the bit-decomposition up to the first bit. A communication cost of this case is communication traffic of 6 bits and one communication round. In this way, the secret calculation execution part 302 also performs a comparison in magnitude with respect to a score of an element which is determined to be smaller by the diagonal comparison in magnitude and a score of an element located at the upper left of an element for which a score is to be calculated, by a restricted comparison in magnitude.

The secret calculation execution part 302 calculates a minimum value with respect to a minimum value $[IorD]''$ on the diagonal and a score of an upper left element (step S107). Concretely, the secret calculation execution part 302 calculates a minimum value in the same way as the expression (8). The minimum value calculated in step S107 is a score at the element for which a score is to be calculated (a cell at the bottom right as shown in FIG. 8). A communication cost required for a minimum value calculation of this case is also communication traffic of 18n bits and three communication rounds.

The communication cost required for a calculation of a score including the above restricted comparison in magnitude is summarized that communication traffic is 36n+18 bits and the number of communication rounds is 9 (nine) rounds.

As described above, each secret calculation server 20, if a condition (an absolute value of a difference value between two shares which are secret-shared is less than or equal to a natural number t) as shown in the expression (3) is satisfied, calculates a difference value between the two shares. Furthermore, each secret calculation server 20 performs a comparison in magnitude between the two shares using the bit-decomposition from a least significant bit to the m-th bit with respect to the above difference value.

[Hardware Configuration]

Next, a hardware configuration of each apparatus making up a secret calculation system will be described.

Figure 9:
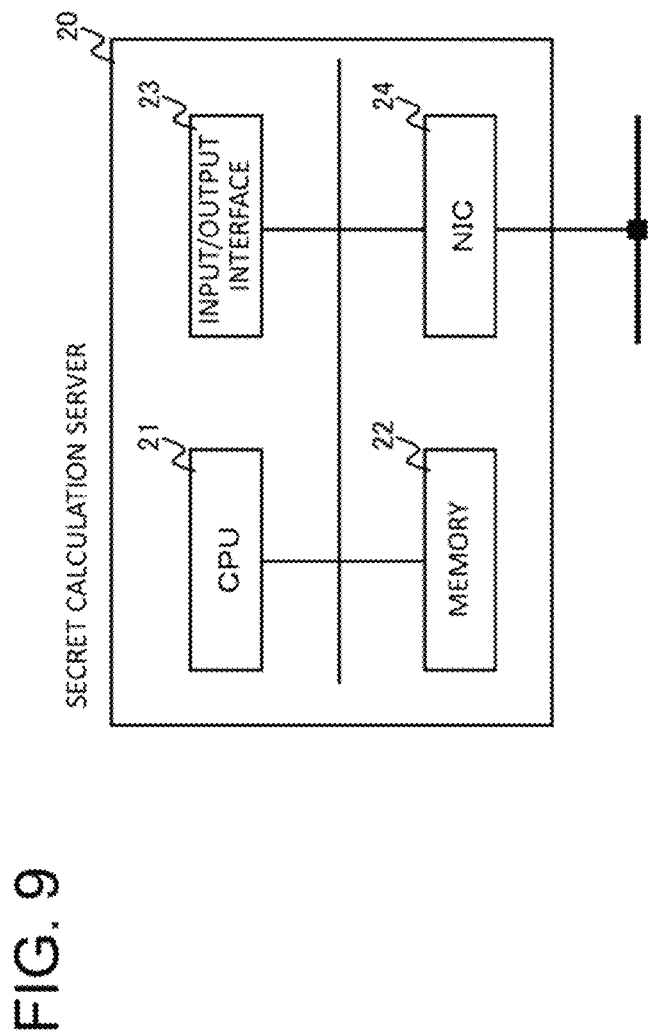
FIG. 9 is a diagram illustrating an example of a hardware configuration of the secret calculation server.

FIG. 9 is a diagram illustrating an example of a hardware configuration of the secret calculation server 20. The secret calculation server 20 is realized by a so-called information processing apparatus (computer) and has a configuration as exemplified by FIG. 9. For example, the secret calculation server 20 has a CPU (Central Processing Unit) 21, a memory 22, an input/output interface 23 and an NIC (Network Interface Card) 24 and so on which are communication facilities, and so on, which are mutually connected by an internal bus.

However, the configuration as shown in FIG. 9 does not intend to limit the hardware configuration of the secret calculation server 20. The secret calculation server 20 may include a hardware(s) which is not illustrated. The number of CPUs and so on included in the secret calculation server 20 is not intended to be limited to the example as shown in FIG. 9, and for example, a plurality of CPUs 21 may be included in the secret calculation server 20.

The memory 22 is a RAM Random Access Memory), a ROM (Read only Memory), an auxiliary storage device (hard disk and so on) and so on.

The input/output interface 23 is an interface of an input/output apparatus which is not illustrated. The input/output apparatus includes, for example, a display apparatus, an operation device and so on. The display apparatus is, for example, a liquid crystal display and so on. The operation device is, for example a keyboard and a mouse and so on.

A function of the secret calculation server 20 is realized by a processing module as described above. The processing module is realized, for example, by executing a program stored in a memory 22 by the CPU 21. Furthermore, the program can be downloaded through a network or updated using a storage medium on which the program is stored. Furthermore, the above processing module may be realized by a semiconductor chip. That is, a function performed by the above processing module can be realized by a hardware of some kind or a software executed using a hardware.

Please note that the control apparatus 10 can also be realized by an information processing apparatus (computer) and the detailed description thereof will be omitted because the hardware configuration is clear to those skilled in the art.

As described above, in the secret calculation system according to the first example embodiment, a comparison in magnitude required for a calculation of an edit distance is performed by the restricted comparison in magnitude. More concretely, the secret calculation server 20, in a calculation of the bit-decomposition required for performing a comparison in magnitude between two scores, performs the bit-decomposition up to a digit (an m-th bit) determined by a predetermined condition (a condition of the expression (3)), without performing decomposition of all the digits, and performs a comparison in magnitude. As a result, a cost for performing a calculation of an edit distance by a secret calculation can be reduced.

Concretely, as described above, if the bit-decomposition is performed using the disclosure of NPL 11 for a scheme disclosed in NPL 10, communication traffic of 6(n−1) bits and n−1 communication rounds are required. That is, in a secret calculation using an existing bit-decomposition, a cost of a comparison in magnitude (communication traffic, the number of communication rounds) is proportional to n when a size of a ring of a score in a DP matrix is $2^n$.

In contrast, when a secret calculation of an edit distance is performed using "a restricted comparison in magnitude" as described in the first example embodiment, a cost required for a comparison in magnitude becomes to be a constant size which is not proportional to n as described below.

A diagonal comparison in magnitude (t=2): communication traffic is 12 bits and the number of communication rounds is 2.

A comparison in magnitude between adjacent elements (t=1): communication traffic is 6 bits and the number of communication rounds is 1.

As described above, in the secret calculation system according to the first example embodiment, it is possible to reduce a cost required for a comparison in magnitude which is necessary for performing an edit distance calculation by a secret calculation to a constant size which does not depend on "n" for determining a ring size. As a result, the secret calculation system according to the first example embodiment, even if the number of characters of DNA sequences which is a target of an edit distance calculation becomes large (when a ring size $2^n$ becomes large), it is possible to obtain an edit distance with a small cost. In other words, as the number of characters of DNA sequences which are to be compared increases, an effect of communication cost reduction by the restricted comparison in magnitude as described above becomes more remarkable.

[Second Example Embodiment]

Next, a second example embodiment will be described in detail with reference to drawings.

In the first example embodiment, a comparison in magnitude between scores on a diagonal is performed to calculate an edit distance. Here, because an absolute value of a difference between scores on a diagonal is less than or equal to 2, bit-decomposition up to the second bit is necessary for the comparison in magnitude. As in the above example, if the number of digits to be bit-decomposed increases, a cost required for a comparison in magnitude (communication traffic and the number of communication rounds) increases.

In the second example embodiment, a secret calculation system will be described, in which a cost required for a comparison in magnitude is reduced by changing a calculation algorithm of an edit distance. The secret calculation system according to the second example embodiment obviates a diagonal comparison in magnitude by changing targets of a comparison in magnitude and realizes reduction of the number of communication round(s).

Please note that because the secret calculation system, the control apparatus 10 and the secret calculation server 20 according to the first example embodiment and those according to the second example embodiment can be the same, descriptions corresponding to FIG. 2 and so on will be omitted. In the second example embodiment, a difference from the first example embodiment will be mainly described.

Figure 10:
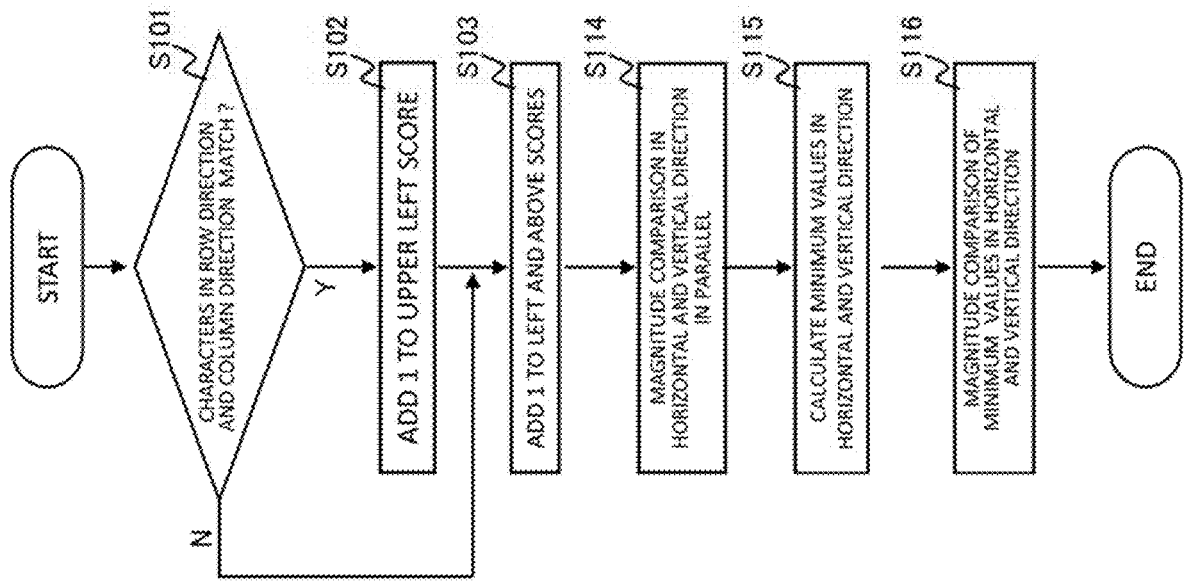
FIG. 10 is a flowchart illustrating an example of a score calculation operation by a secret calculation execution part according to a second example embodiment.

FIG. 10 is a flowchart illustrating an example of a score calculation operation in a secret calculation execution part 302 according to the second example embodiment. Since processings of steps S101 to S103 in FIG. 7 and those in FIG. 10 can be the same processings, the same reference signs are assigned thereto and detailed description thereof will be omitted.

In step S114, the secret calculation execution part 302 performs a comparison in magnitude between scores in a horizontal direction and a comparison in magnitude between scores in a vertical direction in parallel. Concretely, the secret calculation execution part 302 performs a comparison in magnitude with respect to scores at the upper left and above as viewed from an element for which a score is to be calculated in FIG. 8 (a cell at the bottom right), (a comparison in magnitude in a horizontal direction). Furthermore, the secret calculation execution part 302 performs a comparison in magnitude with respect to scores at the upper left and at the left as viewed from the element for which a score is to be calculated (a comparison in magnitude in a vertical direction) in parallel with the comparison in magnitude in the horizontal direction. The secret calculation execution part 302 performs these comparisons in magnitude by the restricted comparison in magnitude as described above. Concretely, the secret calculation execution part 302 performs the restricted comparisons in magnitude with the bit-decomposition up to a first bit in the horizontal direction and in the vertical direction, respectively.

The secret calculation execution part 302 calculates a result [h] of the comparison in magnitude in the above horizontal direction and a result [v] of the comparison in magnitude in the above vertical direction by an expression (9) below.

$$[h]=[D_{i-1,j-1}+1 <_r D_{i-1,j}+1]^n$$

$$[v]=[D_{i-1,j-1}+1 <_r D_{i,j-1}+1]^n \quad \text{[expression (9)]}$$

Please note that the reason why the secret calculation execution part 302 calculates the above two comparisons in magnitude in parallel (a calculation at the same time) is to suppress a communication cost required for the calculation. Communication between the secret calculation servers 20 is necessary for the above comparison in magnitude. At this time, the rise of a communication cost is suppressed by causing communications of the two comparisons in magnitude to be taken place at the same timing. A communication cost required for comparisons in magnitude in the horizontal direction and in the vertical direction amounts to communication traffic of 12 bits and one communication round.

In step S115, the secret calculation execution part 302 performs calculations of a minimum value $[H]^n$ in the horizontal direction and a minimum value $[V]^n$ in the vertical direction in parallel. Concretely, the secret calculation execution part 302 calculates the above two minimum values by an expression (10) below.

$$[H]^n = \text{inj}([h]) \cdot [D_{i-1,j-1}+1]^n + \text{inj}([h \oplus 1]) \cdot [D_{i-1,j}+1]^n$$

$$[V]^n = \text{inj}([v]) \cdot [D_{i-1,j-1}+1]^n + \text{inj}([v \oplus 1]) \cdot [D_{i,j-1}+1]^n \quad \text{[expression (10)]}$$

The secret calculation execution part 302 also calculates with respect to the two minimum values in parallel in order to suppress a communication cost. A communication cost required for a calculation of the minimum values in the horizontal direction and in the vertical direction amounts to communication traffic of 36n bits and three communication rounds.

The secret calculation execution part 302 performs a comparison in magnitude between the minimum value $[H]^n$ in the horizontal direction and the minimum value $[V]^n$ in the vertical direction (step S116). In this case, the secret calculation execution part 302 identifies a smaller value of the two minimum values by the restricted comparison in magnitude by bit-decomposition up to a first bit. A communication cost required for the processing amounts to communication traffic of 18n+6 bits and 4 communication rounds. In this way, a comparison in magnitude with respect to a score of an element determined to be smaller by the comparison in magnitude in the horizontal direction and a score of an element determined to be smaller by the comparison in magnitude in the vertical direction, is also performed by a restricted comparison in magnitude.

The secret calculation execution part 302 adopts a value determined to be smaller, as a result of the comparison in magnitude in step S116, as a score of a target for which a score is to be calculated.

The communication cost required for a calculation of a minimum value in the second example embodiment is summarized that communication traffic is 54n+18 bits and the number of communication rounds is 8.

As described above, in the secret calculation system according to the second example embodiment, the number of communication rounds for a minimum value calculation is reduced by changing targets of a comparison in magnitude from those of the first example embodiment. Concretely, although, in the first example embodiment, 9 rounds are necessary, the number of times of the communication is reduced to 8 rounds in the second example embodiment. However, because, in the second example embodiment, the number of times of the restricted comparison in magnitude increases, communication traffic required for calculation of the edit distance increases.

In the second example embodiment, although, compared with the first example embodiment, a cost with respect to the number of communication rounds reduces, a cost with respect to communication traffic increases. Whether to employ the edit distance calculation method according to the first example embodiment or that according to the second example embodiment may be determined according to an environment where the secret calculation system is arranged. For example, if a band range of the communication path connecting each secret calculation server 20 is narrow, the edit distance calculation method according to the first example embodiment whose cost of the communication traffic is low is advantageous. On the other hand, if a band range of the communication path connecting each secret calculation server 20 is broad, the edit distance calculation method according to the second example embodiment in which the number of communication rounds is small is advantageous because a lot of data can be transmitted and received in one communication.

[Comparison with Other Scheme]

Next, a result of comparison between a communication cost required for calculation of the edit distance using the restricted comparison in magnitude described in the first and the second example embodiments (a cost until a final edit distance is obtained) and a communication cost required for calculation of the edit distance using the existing comparison in magnitude, is disclosed.

Here, a communication cost by a comparison in magnitude using an existing bit-decomposition to a WF method disclosed in NPL 5 and a communication cost by a comparison in magnitude using an existing bit-decomposition to a bit-parallelism method disclosed in NPL 6 is disclosed as a comparison example. Please note that communication costs by the above four schemes including methods of the present disclosure are costs when an edit distance is calculated by schemes of NPLs 10 and 11.

A comparison of the above communication costs has been performed under a condition where a character length is 100 characters, a bit-length of each character is 2 bits, a bit-length of a score is 32 bits, and types of alphabet included in character-strings to be compared are four types. FIG. 11 is a diagram summarizing communication costs (communication traffic and the number of communication rounds required for a calculation of an edit distance by secret calculation methods of NPLs 10 and 11) required until an edit distance is obtained under the above condition. With reference to FIG. 11, compared with a calculation of an edit distance by the existing methods (a WF method as disclosed in NPL 5 and a bit-parallelism method as disclosed in NPL 6), it is understood that communication costs are greatly reduced for the methods of a calculation of an edit distance by the first and the second example embodiments. In particular, with respect to the communication rounds, it is reduced to 20% or less. Please note that the edit distance calculated by the above four schemes are the same (precision of calculation results are the same). That is, using the edit distance calculation method of the present disclosure, an accurate edit distance can be calculated at high speed.

[Modification Examples]

Figure 12:
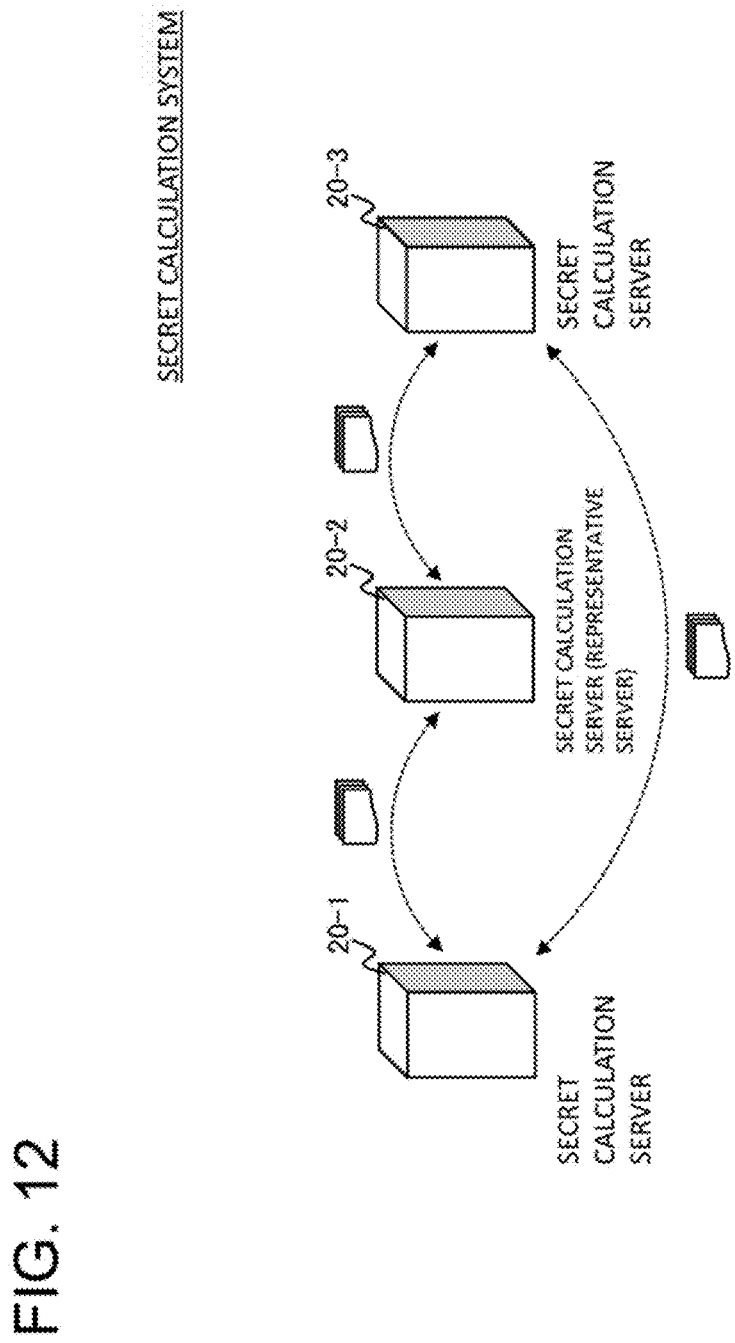
FIG. 12 is a diagram illustrating an example of other configuration of a secret calculation system.

A configuration and an operation and so on of the secret calculation system described in the first and second example embodiments are examples and do not intend to limit the configuration of the system and so on. For example, the control apparatus 10 as shown in FIG. 2 is not a type which centrally control the secret calculation server 20, but it may be a configuration in which one secret calculation server 20 is selected from a plurality of secret calculation servers 20 shown in FIG. 12 as a "representative server". In this case, the secret calculation server 20 selected as the representative server may perform the same controls as the control apparatus 10 to the other secret calculation servers 20. Concretely, the representative server may secret-share input data, distribute secret-shared data to the other secret calculation server 20, obtain and decode results of a secret calculation from the other secret calculation servers 20.

In the above example embodiments, a calculation of an edit distance using a DP matrix as described in NPL 5 is described as an example, the restricted comparison in magnitude of the present disclosure may be applied to a calculation of an edit distance as disclosed in NPL 17.

Although, in a plurality of flowcharts used in the above description, a plurality of processes (processings) are described in sequence, an execution order of processes performed in each example embodiment is not limited by an order of description thereof. In each example embodiment, it is possible to change an order of processes illustrated in the drawings within an extent that will not offer any problem to content, for example, executing each processing in parallel and so on.

It is possible to cause a computer to function as a secret calculation server by installing a secret calculation program in a storage part of an information processing apparatus (the computer). Furthermore, it is possible to perform a secret calculation method by a computer by causing the computer to execute the secret calculation program.

Although, in the above example embodiments, calculation of an edit distance for two DNA sequences is exemplified as an application to which a "restricted comparison in magnitude" is to be applied, it is of course possible that the processings of the restricted comparison in magnitude are applied to processings other than the calculation of an edit distance. That is, if a condition as shown by the expression (2) is satisfied, it is possible to determine which of two shares ([v]″ and [v′]″) is greater by the above restricted comparison in magnitude. In other words, when a provable range of a difference (v−v′) between two shares is limited in advance, it is possible to obtain a result of a comparison in magnitude by bit-decomposition up to a part (digit) of entire bits.

Please note that each disclosure of the above Patent Literatures and so on is incorporated herein by reference thereto. Variations and adjustments of the example embodiments and examples are possible within the scope of the overall disclosure (including the claims) of the present invention and based on the basic technical concept of the present invention. Various combinations and selections (including partial deletion) of various disclosed elements (including each of the elements in each of the claims, example embodiments, examples, drawings, etc.) are possible within the scope of the entire disclosure of the present invention. Namely, the present invention of course includes various variations and modifications that could be made by those skilled in the art according to the overall disclosure including the claims and the technical concept. In particular, with respect to the numerical ranges described herein, any numerical values or small range(s) included in the ranges should be construed as being expressly described even if not particularly mentioned.

SIGNS LIST 10 control apparatus (controller)
20, 20-1 to 20-3 secret calculation server
21 CPU (Central Processing Unit)
22 memory
23 input/output interface
24 NIC (Network Interface Card)
100 information processing apparatus
201, 301 communication control part
202 secret sharing data generation part
203 secret sharing data decoding part
302 secret calculation execution part

What is claimed is:
1. An information processing apparatus comprising:
at least a processor; and
a memory in circuit communication with the processor and storing program instructions executable by the processor to:
receive a first DNA sequence and a second DNA sequence from a control server;
perform a secret calculation as to an edit distance between the first and second DNA sequences, including generation of a dynamic programming (DP) matrix having a plurality of elements based on the first and second DNA sequences, and calculation of a score for each element; and
transmit a result of the secret calculation back to the control server, the control server then decoding the result,
wherein the instructions are executable by the processor to, as part of the calculation of the score for each element:
receive a first share and a and a second share that are secret-shared and that each belong to a residue class ring modulo $2^n$, where n is a natural number, the first share is $\geq 0$, and the second share is $<2^n$;
determine a natural number t such that an absolute value of a difference value between the first share and the second share is less than or equal to the natural number t and such that $t<2^{n-1}$;
determine a natural number m that satisfies $2^{m-1} \leq t < 2^m \leq 2^{n-1}$, where the difference value has a number of bits greater than m such that an m-th bit of the difference value is not a most significant bit of the difference value;
incompletely calculate the difference value between the first share and the second share, by performing bit-composition for each of a plurality of bits of the difference value from a least significant bit to the m-th bit, such that not all of a plurality of bits of the difference value are calculated; and
perform the comparison in magnitude based on the difference value that has been incompletely calculated,
wherein incompletely calculating the difference value is sufficient for performing a comparison in magnitude of the first share and the second share, such that the comparison in magnitude is still accurate even though the difference value has been incompletely calculated,
wherein incompletely calculating the difference value, as opposed to completely calculating the difference value for all the plurality of bits, improves processing speed while still providing for the comparison in magnitude being accurate.
2. The information processing apparatus according to claim 1, wherein the information processing apparatus determines which is greater the first share or the second share according to a value of the m-th bit of the difference value upon which the bit-decomposition has been performed.
3. The information processing apparatus according to claim 1, wherein the information processing apparatus performs the bit-decomposition used for a diagonal comparison in magnitude sequentially from the least significant bit to a second bit, and performs the bit-decomposition used for a first comparison in magnitude from a least significant bit to a first bit.
4. The information processing apparatus according to claim 1, wherein a communication cost required for a diagonal comparison in magnitude is communication traffic of 12 bits and two communication rounds, and a communication cost required for a first comparison in magnitude is communication traffic of 6 bits and one communication round.
5. The information processing apparatus according to claim 1, wherein the information processing apparatus performs, in the DP matrix used for the calculation of the edit distance, a horizontal comparison in magnitude of the scores for respective elements located above and at an upper left of an element for which the score is calculated, and a vertical comparison in magnitude of the scores for respective elements located at the upper left and to a left of the element for which the score is to be calculated, by a restricted comparison in magnitude.
6. The information processing apparatus according to claim 5, wherein the information processing apparatus performs a second comparison in magnitude between the score of the element which is determined to be smaller by the horizontal comparison in magnitude and the score of the element which is determined to be smaller by the vertical comparison in magnitude, by the restricted comparison in magnitude.
7. The information processing apparatus according to claim 6, wherein the bit-decomposition used for the horizontal, the vertical and the second comparisons in magnitude is performed from the least significant bit to a first bit.
8. The information processing apparatus according to claim 6, wherein each of communication costs required for the horizontal, the vertical and the second comparisons in magnitude is communication traffic of 6 bits and one communication round.
9. A secret calculation method comprising:
receiving, by a processor, a first DNA sequence and a second DNA sequence from a control server;

performing, by the processor, a secret calculation as to an edit distance between the first and second DNA sequences, including generation of a dynamic programming (DP) matrix having a plurality of elements based on the first and second DNA sequences, and calculation of a score for each element; and transmitting, by the processor, a result of the secret calculation back to the control server, the control server then decoding the result, wherein the calculation of the score for each element includes:

receiving a first share and a and a second share that are secret-shared and that each belong to a residue class ring modulo $2^n$, where n is a natural number, the first share is $\geq 0$, and the second share is $<2^n$;

determining a natural number t such that an absolute value of a difference value between the first share and the second share is less than or equal to the natural number t and such that $t<2^{n-1}$;

determining a natural number m that satisfies $2^{m-1} \leq t < 2^m \leq 2^{n-1}$, where the difference value has a number of bits greater than m such that an m-th bit of the difference value is not a most significant bit of the difference value;

incompletely calculating the difference value between the first share and the second share, by performing bit-composition for each of a plurality of bits of the difference value from a least significant bit to the m-th bit, such that not all of a plurality of bits of the difference value are calculated; and performing the comparison in magnitude based on the difference value that has been incompletely calculated, wherein incompletely calculating the difference value is sufficient for performing a comparison in magnitude of the first share and the second share, such that the comparison in magnitude is still accurate even though the difference value has been incompletely calculated, wherein incompletely calculating the difference value, as opposed to completely calculating the difference value for all the plurality of bits, improves processing speed while still providing for the comparison in magnitude being accurate.

10. The secret calculation method according to claim 9, wherein performing the comparison in magnitude comprises determining which is greater the first share or the second share according to a value of the m-th bit of the difference value upon which the bit-decomposition has been performed.

11. The secret calculation method according to claim 9, wherein the bit-decomposition used for a diagonal comparison in magnitude sequentially from the least significant bit to a second bit, and performs the bit-decomposition used for a first comparison in magnitude from a least significant bit to a first bit.

12. The secret calculation method according to claim 9, wherein a communication cost required for a diagonal comparison in magnitude is communication traffic of 12 bits and two communication rounds, and a communication cost required for a first comparison in magnitude is communication traffic of 6 bits and one communication round.

13. The secret calculation method according to claim 9, wherein calculation of the edit distance includes performing, in the DP matrix used for the calculation of the edit distance, a horizontal comparison in magnitude of the scores for respective elements located above and at an upper left of an element for which the score is calculated, and a vertical comparison in magnitude of the scores for respective elements located at the upper left and to a left of the element for which the score is calculated, by a restricted comparison in magnitude.

14. A non-transitory computer-readable recording medium storing a program executable by a computer to perform processing comprising:

receiving a first DNA sequence and a second DNA sequence from a control server;

performing a secret calculation as to an edit distance between the first and second DNA sequences, including generation of a dynamic programming (DP) matrix having a plurality of elements based on the first and second DNA sequences, and calculation of a score for each element; and transmitting a result of the secret calculation back to the control server, the control server then decoding the result, wherein the calculation of the score for each element includes:

receiving a first share and a and a second share that are secret-shared and that each belong to a residue class ring modulo $2^n$, where n is a natural number, the first share is $\geq 0$, and the second share is $<2^n$;

determining a natural number t such that an absolute value of a difference value between the first share and the second share is less than or equal to the natural number t and such that $t<2^{n-1}$;

determining a natural number m that satisfies $2^{m-1} \leq t < 2^m \leq 2^{n-1}$, where the difference value has a number of bits greater than m such that an m-th bit of the difference value is not a most significant bit of the difference value;

incompletely calculating the difference value between the first share and the second share, by performing bit-composition for each of a plurality of bits of the difference value from a least significant bit to the m-th bit, such that not all of a plurality of bits of the difference value are calculated; and performing the comparison in magnitude based on the difference value that has been incompletely calculated, wherein incompletely calculating the difference value is sufficient for performing a comparison in magnitude of the first share and the second share, such that the comparison in magnitude is still accurate even though the difference value has been incompletely calculated, wherein incompletely calculating the difference value, as opposed to completely calculating the difference value for all the plurality of bits, improves processing speed while still providing for the comparison in magnitude being accurate.

15. The non-transitory computer-readable recording medium according to claim 14, wherein performing the comparison in magnitude comprises determining which is greater the first share or the second share according to a value of the m-th bit of the difference value upon which the bit-decomposition has been performed.

16. The non-transitory computer-readable recording medium according to claim 14, wherein the bit-decomposition used for a diagonal comparison in magnitude sequentially from the least significant bit to a second bit, and performs the bit-decomposition used for a first comparison in magnitude from a least significant bit to a first bit.

17. The non-transitory computer-readable recording medium according to claim 14, wherein a communication cost required for a diagonal comparison in magnitude is communication traffic of 12 bits and two communication rounds, and a communication cost required for a first comparison in magnitude is communication traffic of 6 bits and one communication round.

18. The non-transitory computer-readable recording medium according to claim 14, wherein calculation of the edit distance includes performing, in the DP matrix used for the calculation of the edit distance, a horizontal comparison in magnitude of the scores for respective elements located above and at an upper left of an element for which the score is calculated, and a vertical comparison in magnitude of the scores for respective elements located at the upper left and to a left of the element for which the score is calculated, by a restricted comparison in magnitude.

* * * * *